(12) United States Patent
Lee

(10) Patent No.: US 7,686,242 B2
(45) Date of Patent: Mar. 30, 2010

(54) FISHING-REEL DRIVING DEVICE

(76) Inventor: Wen-Hsiang Lee, No. 1, Zhongzhe Road, Dadu Shiang, Taichung County (TW)

( * ) Notice: Subject to any disclaimer, the term of this patent is extended or adjusted under 35 U.S.C. 154(b) by 0 days.

(21) Appl. No.: 12/402,566

(22) Filed: Mar. 12, 2009

(65) Prior Publication Data
US 2009/0236456 A1   Sep. 24, 2009

(30) Foreign Application Priority Data
Mar. 20, 2008  (TW) ............................... 97109862 A

(51) Int. Cl.
*A01K 89/01* (2006.01)
(52) U.S. Cl. ........................ 242/311; 242/310; 242/312
(58) Field of Classification Search ................ 242/310, 242/311, 312, 319, 321
See application file for complete search history.

(56) References Cited
U.S. PATENT DOCUMENTS 6,409,113 B1 * 6/2002 Hirayama et al. ........... 242/310
6,902,127 B2 * 6/2005 Nishikawa .................. 242/311
7,028,937 B2 * 4/2006 Hitomi et al. ............... 242/311
7,275,705 B1 * 10/2007 Wong ......................... 242/311
7,341,215 B2 * 3/2008 Martin et al. ............... 242/310

* cited by examiner

*Primary Examiner*—Emmanuel M Marcelo
(74) *Attorney, Agent, or Firm*—Trop, Pruner & Hu, P.C.

(57) ABSTRACT

A fishing-reel driving device includes a reel body having a shell for accommodating a reel driving mechanism. A holding frame includes an axially extending tubular mount with a coupled surface, and a radially extending web terminating at an anchoring edge to be secured to an anchored edge of the shell. A left side cover includes a peripheral abutment edge to be sleeved on the tubular mount, and a faceplate region extending radially to terminate at an outskirt edge. A tubular tightening member has a tubular coupling surface matingly engageable with the coupled surface, and a surrounding abutment edge to force the peripheral abutment edge to move towards the web. An actuating member is insertable into the shell to be coupled to the reel driving mechanism.

7 Claims, 6 Drawing Sheets

US 7,686,242 B2

FISHING-REEL DRIVING DEVICE

CROSS-REFERENCE TO RELATED APPLICATION

This application claims priority of Taiwanese patent Application No. 097109862, filed on Mar. 20, 2008, the disclosure of which is herein incorporated by reference.

BACKGROUND OF THE INVENTION

1. Field of the Invention

This invention relates to a fishing-reel driving device, more particularly to a fishing-reel driving device having a removable decorative cover assembly.

2. Description of the Related Art

Referring to FIG. 1, a conventional fishing reel 1 disclosed in Taiwanese Publication No. 499851 is shown to include a reel body 11, a spool 12 mounted revolvably on the reel body 11 for a fishing line to be wound thereon, and left and right shell halves 13 which are fixedly secured on left and right sides of the reel body 11 by means of screw fasteners 14 for decorative purposes. When it is desired to maintain an interior mechanism of the fishing reel 1, the user has to detach all the screw fasteners 14 to remove the shell halves 13 from the reel body 11 and then disassemble the reel body 11, thereby rendering the maintaining and fixing operation inconvenient and troublesome.

SUMMARY OF THE INVENTION

The object of the present invention is to provide a fishing-reel driving device which has a web-like holding frame and a removable decorative cover assembly so as to facilitate assembling and disassembling of a fishing reel without the need of any tool.

According to this invention, the fishing-reel driving device includes a reel body having a shell which defines therein an accommodation chamber that has an access opening in a left side thereof, and which has an anchored edge that faces leftwards and that borders the access opening. A reel driving mechanism is received in the accommodation chamber, and is accessible through the access opening. A holding frame includes a tubular mount and a web. The tubular mount surrounds an axis, and has an outer tubular end that has a coupled surface surrounding the axis. The web extends radially and outwardly from the tubular mount and terminates at an anchoring edge to be secured to the anchored edge. A left side cover includes a central region which has a peripheral abutment edge that surrounds the axis to be sleeved on the tubular mount, and a faceplate region which extends radially and outwardly from the central region and which terminates at an outskirt edge to conceal the anchoring edge. A tubular tightening member has a tubular coupling surface which surrounds the axis and which is matingly engageable with the coupled surface, and a surrounding abutment edge which is brought to force the peripheral abutment edge to move towards the web. An actuating member has an actuating end that is insertable into the accommodation chamber to be coupled to the reel driving mechanism, and that is mounted to be revolvable about the axis relative to the tubular mount, and an operated end that is externally operable.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
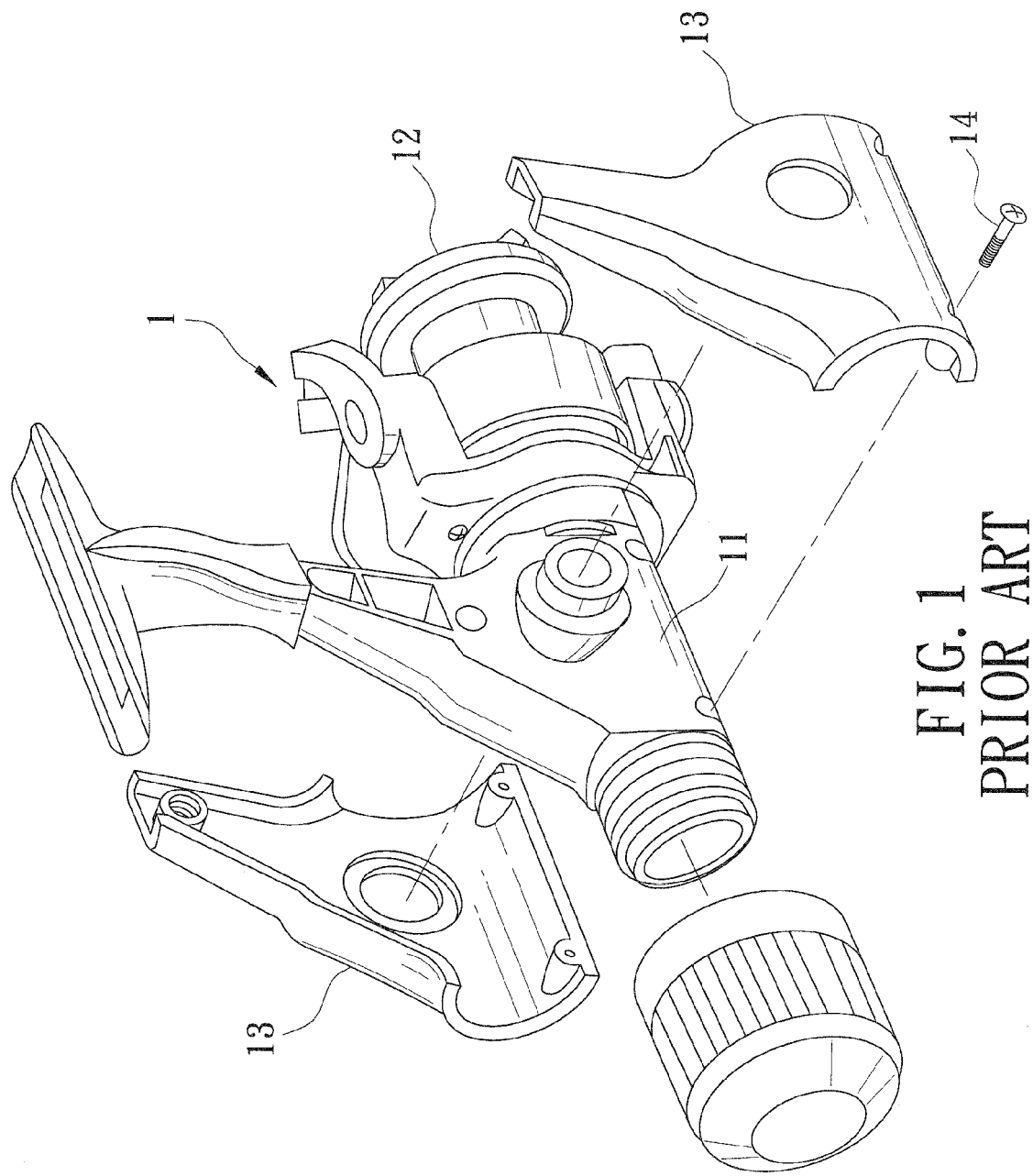
FIG. 1 is an exploded perspective view of a conventional fishing reel.

Before the present invention is described in greater detail, it should be noted that same reference numerals have been used to denote like elements throughout the specification.

Figure 2:
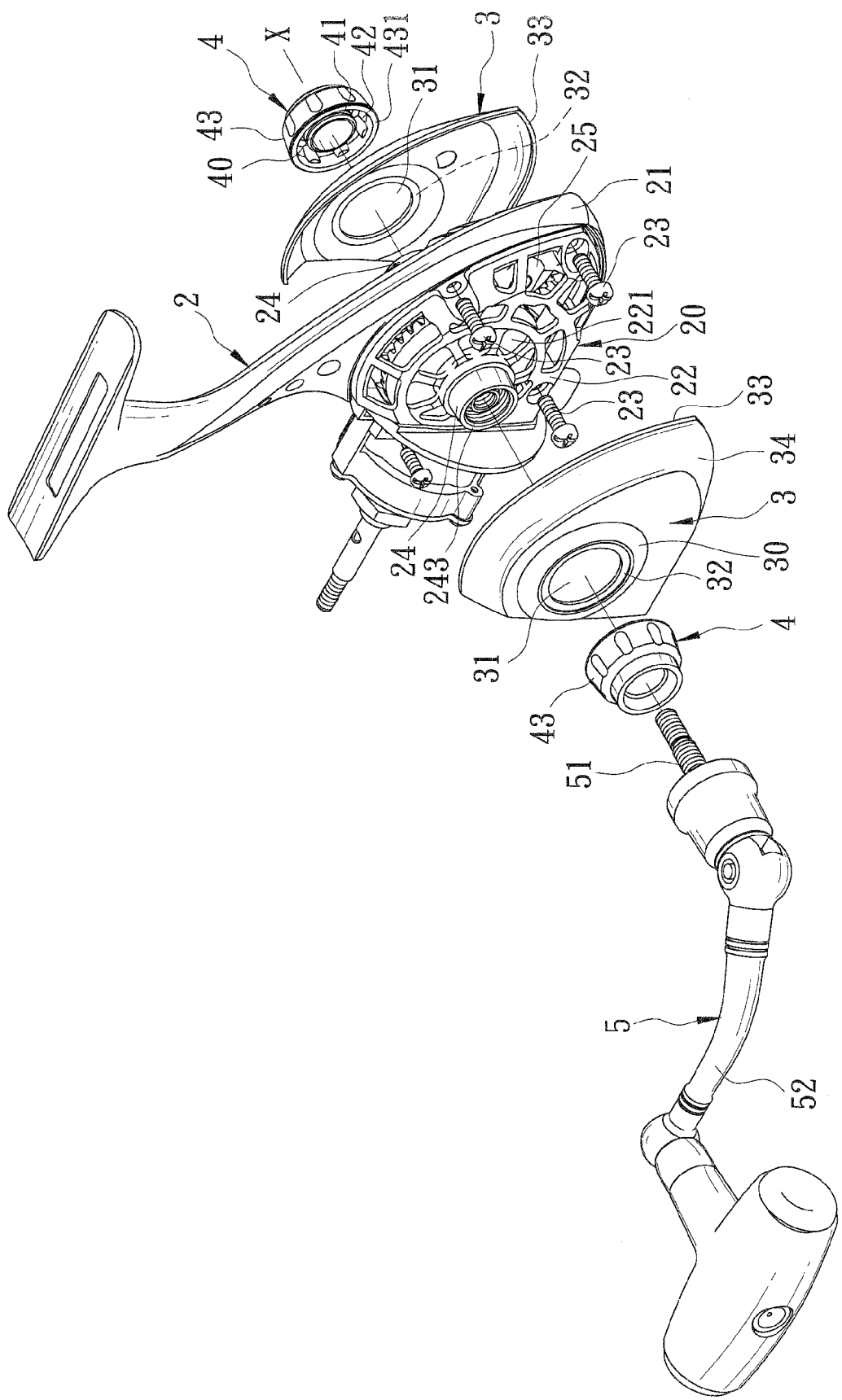
FIG. 2 is an exploded perspective view of the first preferred embodiment of a fishing-reel driving device according to this invention.
Figure 3:
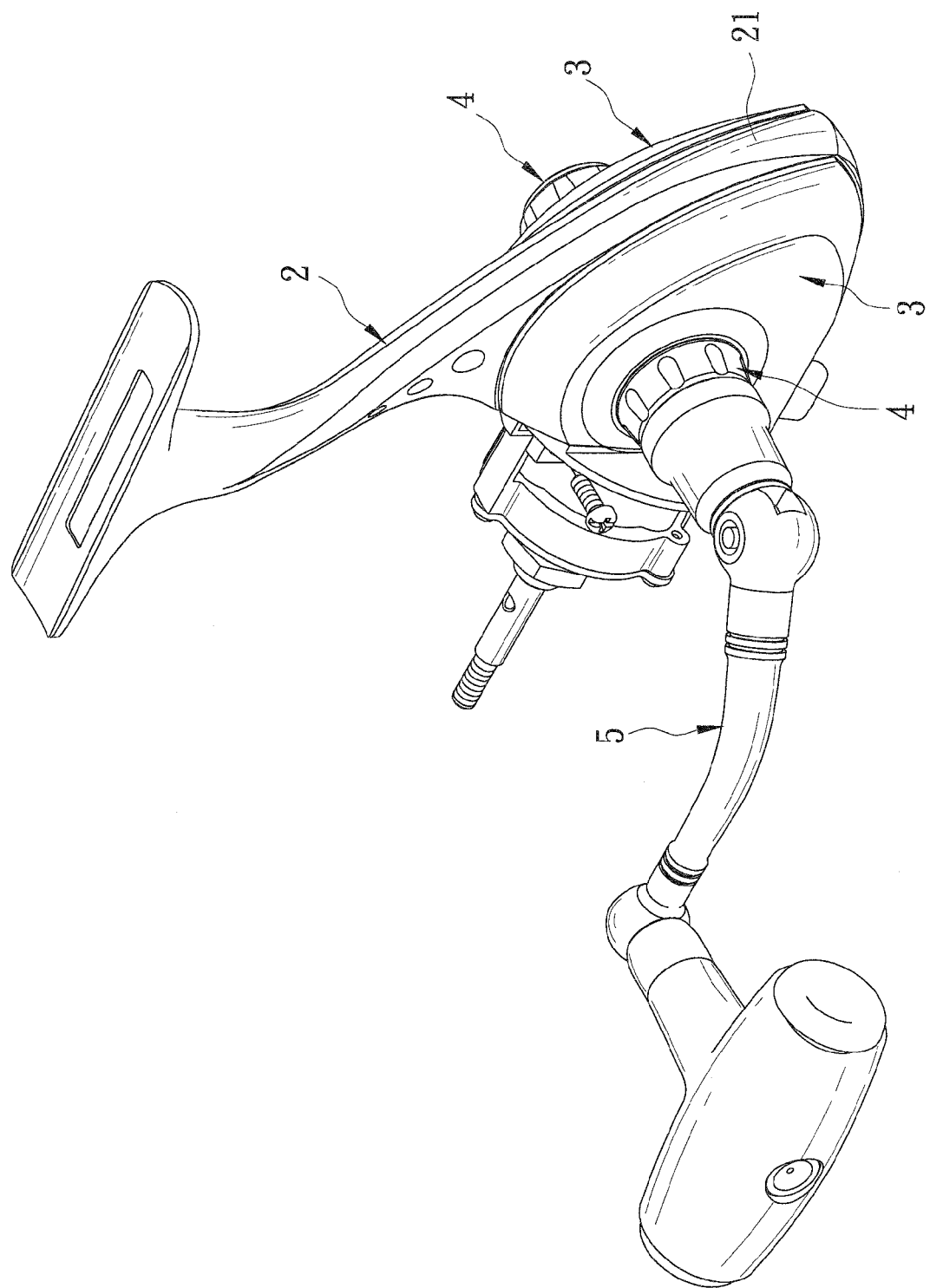
FIG. 3 is a perspective view of the first preferred embodiment.
Figure 4:
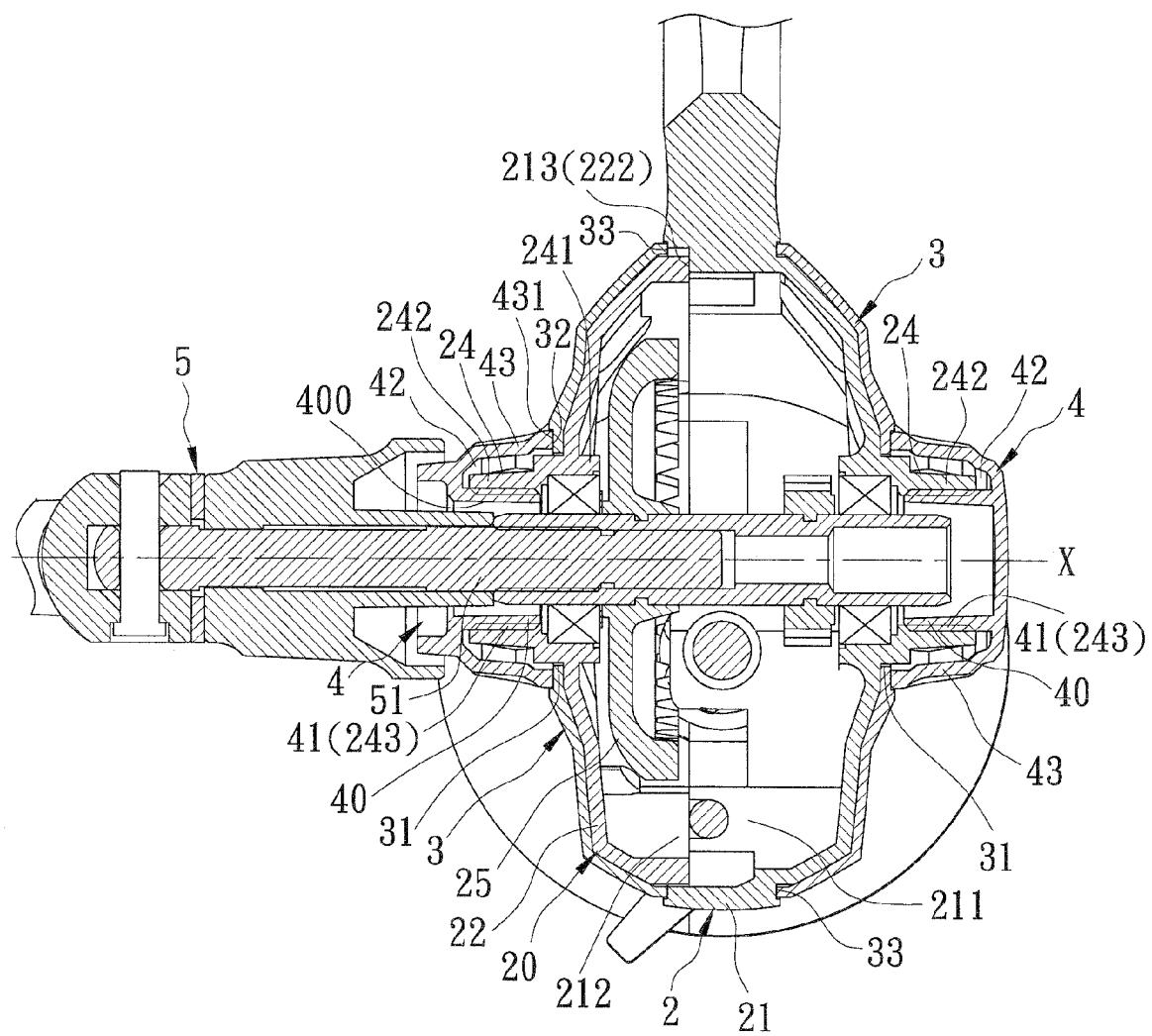
FIG. 4 is a sectional view of the first preferred embodiment.

Referring to FIGS. 2 to 4, the first preferred embodiment of a fishing-reel driving device according to the present invention is shown to comprise a reel body 2, a reel driving mechanism 25, a holding frame 20, left and right side covers 3, a pair of tubular tightening members 4, and an actuating member 5.

The reel body 2 has a shell 21 which defines therein an accommodation chamber 211 that has an access opening 212 in a left side thereof, and which has an anchored edge 213 that faces leftwards and that borders the access opening 212. The reel driving mechanism 25 is received in the accommodation chamber 211, and is accessible through the access opening 212.

The holding frame 20 includes left and right tubular mounts 24 and a web 22. The tubular mounts 24 surround an axis (X). Each of the tubular mounts 24 has an inner tubular end 241 confronting the accommodation chamber 211, and an outer tubular end 242 which is opposite to the inner tubular end 241, and which has a coupled surface 243 surrounding the axis (X). The web 22 extends radially and outwardly from the inner tubular end 241 of the left tubular mount 24, and terminates at an anchoring edge 222 that extends angularly about the axis (X) and that confronts the anchored edge 213 so as to be secured thereto by screw fasteners 23.

Each of the left and right side covers 3 includes a central region 30 which includes a peripheral abutment edge 32 that surrounds the axis (X), that defines a central hole 31, and that is sleeved on a respective one of the left and right tubular mounts 24, and a faceplate region 34 which extends radially and outwardly from the central region 30 and which terminates at an outskirt edge 33. Thus, when the left side cover 3 is sleeved on the left tubular mount 24 and the peripheral abutment edge 32 is forced to move towards the web 22, the outskirt edge 33 can conceal the anchoring edge 222.

In this embodiment, each of the tubular tightening members 4 includes an internal tubular post 40 and an external flared skirt 43. The internal tubular post 40 has a bore-defining tubular surface 400 surrounding the axis (X), and a tubular coupling surface 41 opposite to the bore-defining tubular surface 400 in radial directions. The tubular coupling surface 41 is disposed to be threadedly engaged with the coupled surface 243 of the respective tubular mount 24 such that the tubular tightening member 4 is movable between a locked position, where the internal tubular post 40 is closer to the inner tubular end 241, and a released position, where the internal tubular post 40 is remote from the inner tubular end 241. The external flared skirt 43 extends towards the peripheral abutment edge 32 to terminate at a surrounding abutment edge 431, and surrounds and is spaced apart from the tubular coupling surface 41 radially to define an annular clearance 42 therebetween for accommodating the outer tubular end 242 of the respective tubular mount 24. The surrounding abutment edge 431 confronts the peripheral abutment edge 32 of the respective side cover 3 such that, when each of the tubular tightening members 4 is brought into the locked position, the surrounding abutment edge 431 is brought to tightly abut against the peripheral abutment edge 32, thereby forcing the peripheral abutment edge 32 to displace towards the web 22.

The actuating member 5 has an actuating end 51 that is configured to be insertable into the accommodation chamber 211 through the internal tubular post 40 so as to be coupled to the reel driving mechanism 25, and that is mounted to be revolvable about the axis (X) relative to the left tubular mount 24, and an operated end 52 that is in the form of a handle, that is opposite to the actuating end 51, and that is externally operable to rotate the actuating end 51.

Since the reel driving mechanism 25 and the actuating member 5 are of a hitherto known type, a detail description thereof is dispensed with herein for the sake of brevity.

When it is desired to maintain and fix the reel driving mechanism 25, the user can rotate the tubular tightening members 4 away from the side covers 3 with his/her hand to remove the side covers 3 from the shell 21, without requiring any tool. Thus, left and right sides of the shell 21 are exposed to permit cleaning, and greasing of the reel driving mechanism 25 through openings 221 in the web 22. Therefore, maintenance of the reel driving mechanism 25 is convenient to conduct.

Figure 5:
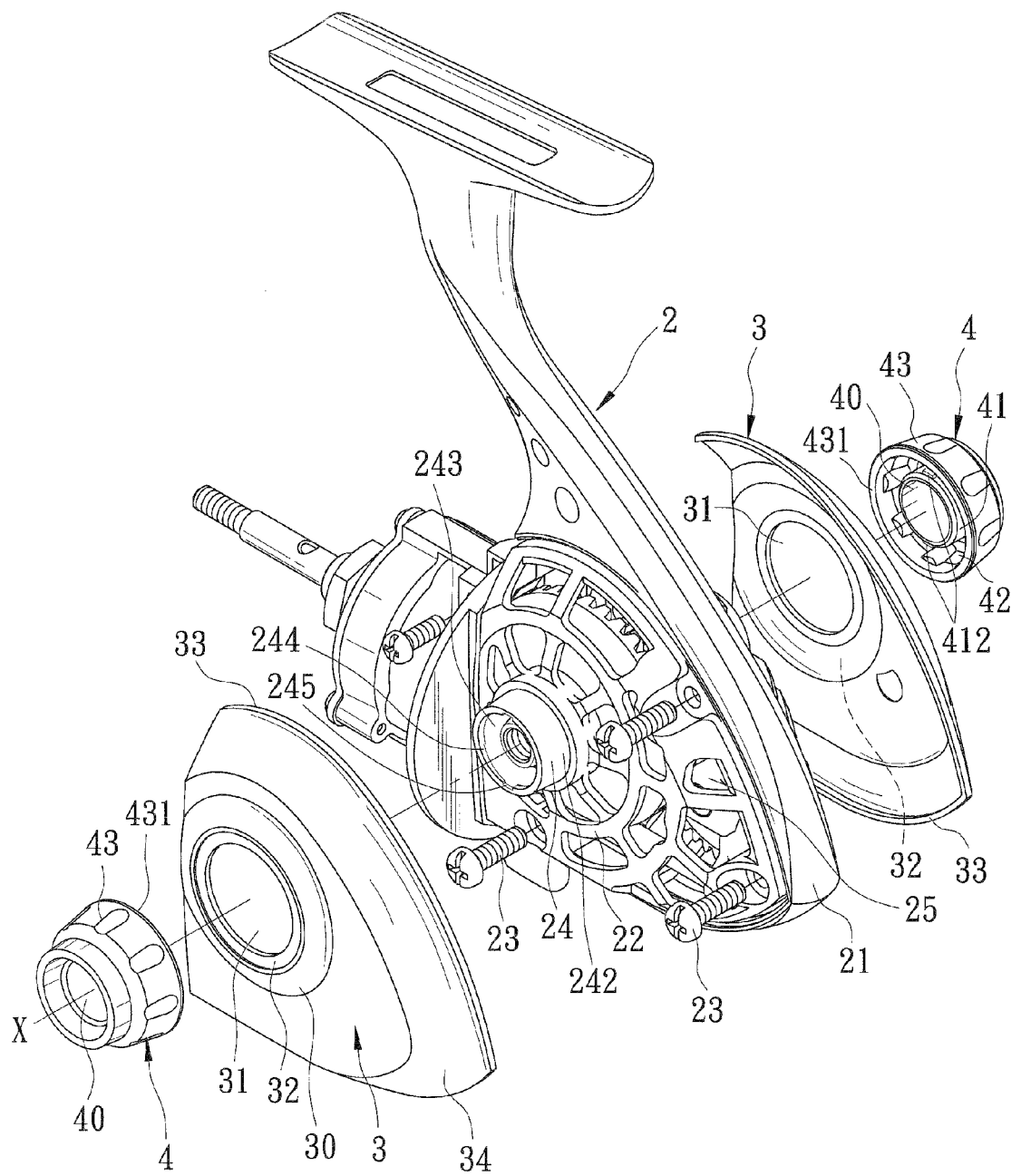
FIG. 5 is an exploded perspective view of the second preferred embodiment of a fishing-reel driving device according to this invention.

Referring to FIG. 5, the second preferred embodiment of a fishing-reel driving device according to this invention is shown to be similar to the first embodiment in construction. In this embodiment, instead of the threaded engagement of the tubular coupling surface 41 with the coupled surface 243, the tubular coupling surface 41 of each tubular tightening member 4 is configured as a pair of protuberances 412, and the coupled surface 243 of the outer tubular end 242 of each tubular mount 24 has an abutment region 244 which faces rightwards, and which has two indentations 245 such that, immediately after the inner tubular post 40 of each tubular tightening member 4 is inserted into the outer tubular end 242 of the respective tubular mount 24 to permit the protuberances 412 to pass over the abutment region 244 through the indentations 245 along the axis (X), turning of the tubular tightening member 4 about the axis (X) will bring the protuberances 412 into frictional engagement with the abutment region 244, thereby tightening the surrounding abutment edge 431 against the peripheral abutment edge 32.

Figure 6:
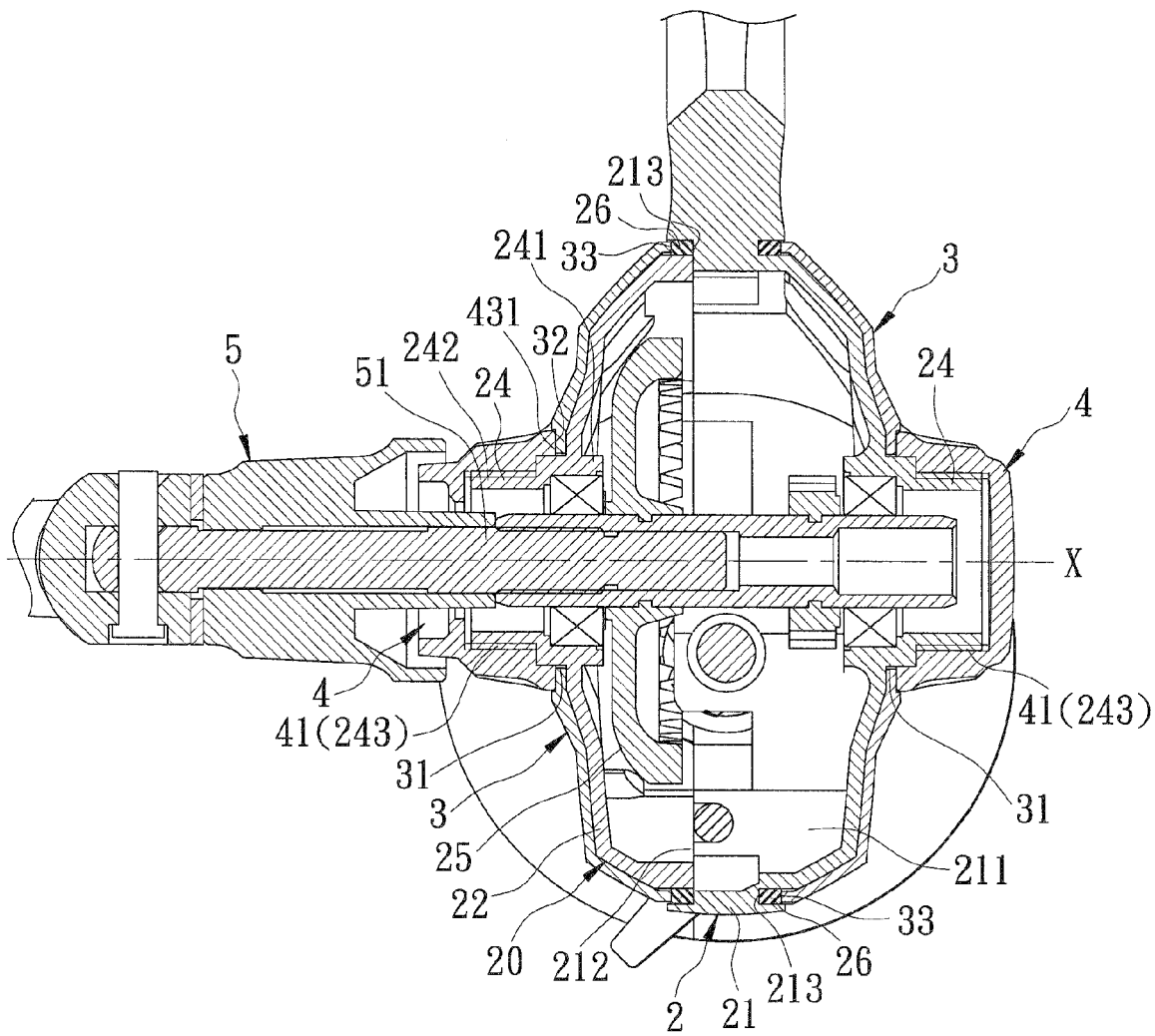
FIG. 6 is a sectional view of the third preferred embodiment of a fishing-reel driving device according to this invention.

Referring to FIG. 6, the third preferred embodiment of a fishing-reel driving device according to this invention is shown to be similar to the first embodiment in construction. In this embodiment, the threaded coupled surface 243 of each tubular mount 24 is formed on an outer surface of the outer tubular end 242, and the tubular coupling surface 41 is configured to confront the coupled surface 243 radially so as to be threadedly engaged therewith. In addition, a seal ring 26 is disposed to provide water-tight engagement between the outskirt edge 33 of each side cover 3 and the respective anchored edge 213 of the shell 21.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

I claim:

1. A fishing-reel driving device comprising:
    a reel body having a shell which defines therein an accommodation chamber that has an access opening in a left side thereof, and which has an anchored edge that faces leftwards and that borders said access opening;
    a reel driving mechanism which is received in said accommodation chamber, and which is accessible through said access opening;
    a holding frame including
        a tubular mount which surrounds an axis and which has an inner tubular end confronting said accommodation chamber, and an outer tubular end that is opposite to said inner tubular end, and that has a coupled surface surrounding the axis, and
        a web which extends radially and outwardly from said inner tubular end and which terminates at an anchoring edge that extends angularly about the axis to confront said anchored edge so as to be secured thereto;
    a left side cover including a central region which has a peripheral abutment edge that surrounds the axis, that defines a central hole, and that is sleeved on said tubular mount, and a faceplate region which extends radially and outwardly from said central region, and which terminates at an outskirt edge that is configured to conceal said anchoring edge when said peripheral abutment edge is sleeved on said tubular mount and is thereby forced to move towards said web;
    a tubular tightening member having
        a tubular coupling surface which surrounds the axis, and which is configured to be matingly engageable with said coupled surface such that said tubular tightening member is movable between a locked position where said tubular tightening member is closer to said inner tubular end, and a released position where said tubular tightening member is remote from said inner tubular end, and
        a surrounding abutment edge which confronts said peripheral abutment edge such that, when said tubular tightening member is brought into the locked position, said surrounding abutment edge is brought to force said peripheral abutment edge to move towards said web; and
    an actuating member which has an actuating end that is configured to be insertable into said accommodation chamber through said tubular coupling surface, that is coupled to said reel driving mechanism, and that is mounted to be revolvable about the axis relative to said tubular mount, and an operated end that is opposite to said actuating end, and that is externally operable to rotate said actuating end.

2. The fishing-reel driving device according to claim 1, wherein said surrounding abutment edge of said tubular tightening member is disposed to abut against said peripheral abutment edge when said tubular tightening member is in the locked position.

3. The fishing-reel driving device according to claim 2, wherein said tubular tightening member includes
    an internal tubular post having a bore-defining tubular surface which surrounds the axis for passage of said actuating end therethrough, said tubular coupling surface being formed on said internal tubular post and opposite to said bore-defining tubular surface in radial directions, and an external flared skirt which extends towards said peripheral abutment edge to terminate at said surrounding abutment edge, and which surrounds and is spaced apart from said tubular coupling surface radially to define an annular clearance therebetween for accommodating said outer tubular end, thereby permitting said tubular coupling surface to be matingly engageable with said coupled surface.

4. The fishing-reel driving device according to claim 3, wherein said tubular coupling surface is threadedly engaged with said coupled surface.

5. The fishing-reel driving device according to claim 3, wherein said tubular coupling surface is configured as a protuberance, said coupled surface of said outer tubular end having an abutment region which faces rightwards, and which is configured such that, immediately after said inner tubular post is inserted into said outer tubular end to permit said protuberance to pass over said abutment region along the axis, turning of said tubular tightening member about the axis will bring said protuberance into frictional engagement with said abutment region, thereby tightening said surrounding abutment edge against said peripheral abutment edge.

6. The fishing-reel driving device according to claim 2, wherein said coupled surface is threaded, and is formed on an outer surface of said outer tubular end, said tubular coupling surface being configured to confront said coupled surface radially so as to be threadedly engaged therewith.

7. The fishing-reel driving device according to claim 1, further comprising a seal ring which is disposed to provide water-tight engagement between said outskirt edge and said anchored edge.

* * * * *